March 14, 1967   H. L. JOSELYN ETAL   3,308,679
JALOUSIE OPERATOR
Filed March 18, 1965

HOMER L. JOSELYN
RALPH N. HOLLOWAY
INVENTORS.

BY Lyon+Lyon
ATTORNEYS

United States Patent Office 3,308,679
Patented Mar. 14, 1967

3,308,679
JALOUSIE OPERATOR
Homer L. Joselyn and Ralph N. Holloway, Monterey Park, Calif., assignors to Parlyn, Inc., Monterey Park, Calif., a corporation of California
Filed Mar. 18, 1965, Ser. No. 440,699
5 Claims. (Cl. 74—531)

The present invention relates to operators useful in the opening and closing of hinged devices and has particular usefulness as an operator for a jalousie or Venetian blind which, in accordance with certain features of the present invention, may be moved from fully open to fully closed positions and may be locked in such positions or any position between such fully open and fully closed positions.

Briefly, the arrangement described herein involves a combination handle member and clamping member which is used to obtain an adjustment and to secure such adjustment when made. A lever structure is pivotally mounted in a housing with a stud bolt on such structure extending through an arcuate slot defined by adjacent flanged portions of the housing. A combination handle member and clamping member is screw-threaded on the stud bolt. Upon turning the handle member on the stud bolt, the lever structure is locked to the housing.

It is therefore a general object of the present invention to provide an improved jalousie operator.

A specific object of the present invention is to provide an operator of this character in which the manually operating member has dual functions, namely of obtaining an adjustment and of securing such adjustment.

Another specific object of the present invention is to provide an operator of this character which is relatively simple, reliable, small, rugged, of relatively light weight, easy to operate and capable of relative inexpensive manufacture with mass production techniques, particularly when one considers the functions accomplished by the operator.

Figure 1:
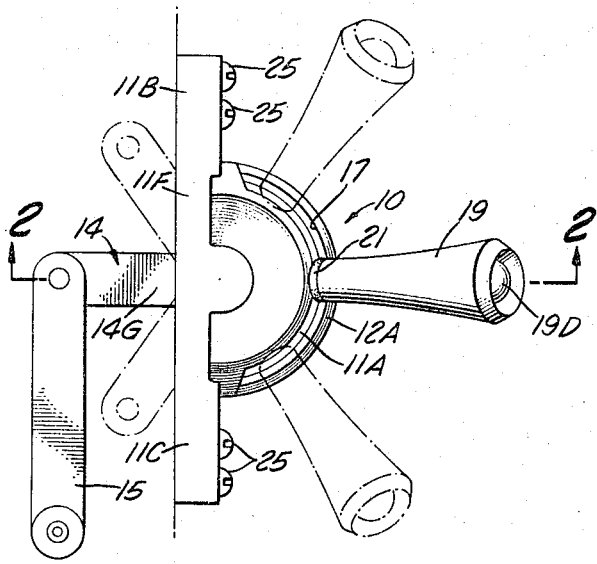

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIG. 1 is a top plan view of an operator embodying features of the present invention and includes dotted lines indicating extreme movements of travel of some elements thereof.

Figure 3:
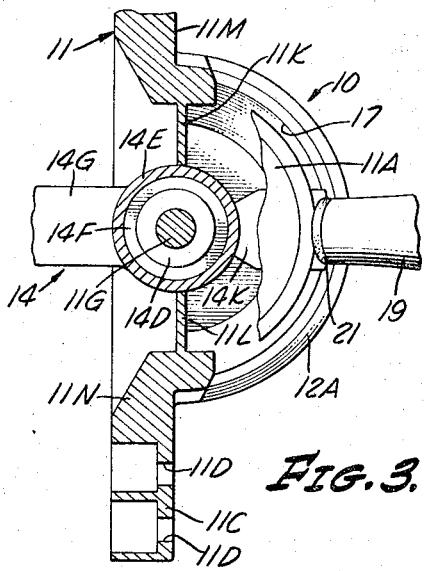
Figure 2:
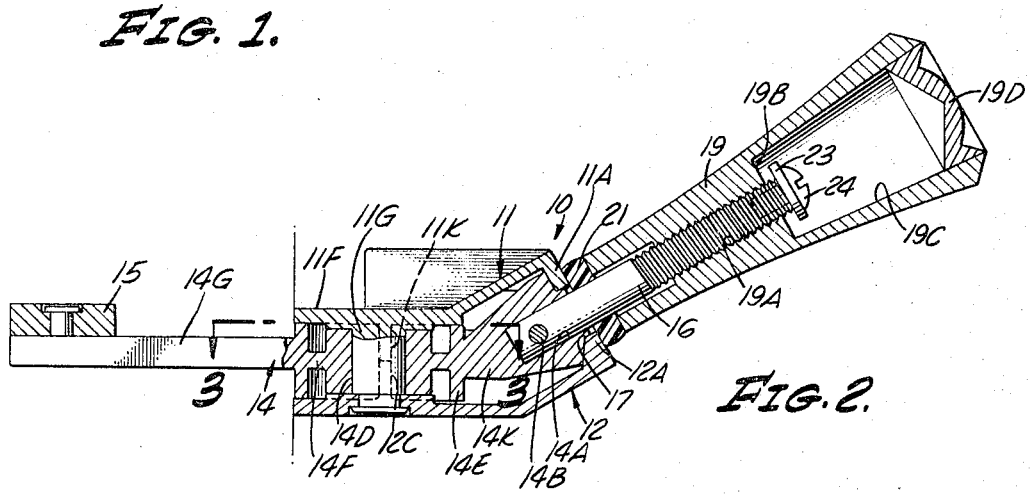

FIGS. 2 and 3 are sectional views taken substantially as indicated by the corresponding lines 2—2 and 3—3 in FIGS. 1 and 2, respectively.

Figure 4:
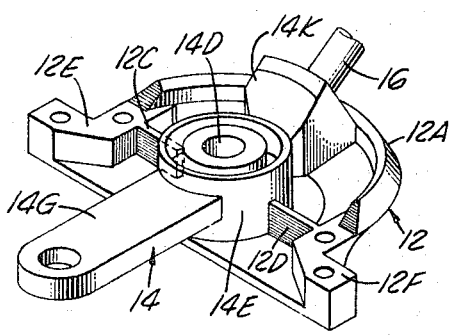

FIG. 4 is a perspective view of a portion of the operator.

Referring to the drawings, the operator illustrated includes a housing 10 formed in a special manner from two die-cast parts 11, 12 which are riveted or staked or otherwise suitably secured together to form the composite housing 10 within which a lever 14 is pivotally mounted.

The lever 14 at one of its ends has one end of a link 15 pivotally attached thereto, the other end of the link 15 being adapted for connection to the movable portion of a jalousie structure (not shown) for moving and positioning the same. Also, the lever 14 is formed with a blind cylindrical hole 14A, the axis of which is offset with respect to the plane in which the lever 14 pivots, and fitted within such hole 14A is one end of a stud bolt 16, the bolt 16 being secured within the lever hole 14A by a pin 14B.

This stud bolt 16 passes through an arcuate slotted portion 17 defined by oppositely disposed curved flange portions 11A, 12A of housing parts 11 and 12, respectively, and engages a threaded portion 19A extending axially within handle member 19. A washer 21 of nylon or other like material is retained loosely on bolt 16 between the inner end of handle member 19 and the outer surface of the flanged portions 11A, 12A.

A stop washer 23 retained by screw 24 threaded in the outer end of stud bolt 16 cooperates with an inner wall portion 19B of member 19 to limit the extent of rotation of the handle member 19 on stud bolt 16. This wall portion 19B defines the end of a cylindrical opening 19C which may be closed by a plug 19D press-fitted into the opening 19C after the screw 24 is tightened to retain the stop washer 23.

It will be seen that when the handle member 19 is screwed inwardly, the nylon washer 21 is clamped between member 19 and housing 10 to prevent pivoting of lever 14, i.e. to secure the adjustment of the lever 14.

For these purposes, the housing part 11, referred to as the front housing, is formed with two outer hollow, generally rectangular base portions 11B, 11C which are apertured, as indicated at 11D in FIG. 3, for passage of fastening elements 25 (FIG. 1) that serve to stationarily fasten the operator assembly on an apertured flat stationary support (not shown) through which the lever 14 extends as is generally conventional in the mounting of jalousie operators.

These outer portions 11B, 11C are integrally formed with an interconnecting intermediate front wall portion 11F and also with the centrally disposed angularly offset arcuate flanged portion 11A. Extending from this wall portion is a cylindrical post 11G (FIGS. 2 and 3) which extends into a cylindrical apertured portion 14D of lever 14 to serve as its pivot.

The lever 14 is constructed in part as a portion of a dust trap. This cylindrical apertured portion 14D is concentric with an outer ring portion 14E and is joined thereto by a centrally disposed annular web portion 14F, with the lever arm 14G and stud bolt support portion 14K in the form of a block extending from diametrically opposite regions of the ring portion 14E. This block 14K at extreme movements of pivotal movement engages with web portions 12C, 12D (and like aligned web portions 11K 11L) all serving as stop members and dust baffles.

The two housing parts 11, 12 are secured together at the abutting faces of their raised abutments 11M, 11N, 12E, 12F (FIGS. 3 and 4) using suitable securing means such as, for example, by riveting or staking.

In operation, when an adjustment is desired, the handle member 19 which is also a clamping member is first turned about its axis on the stud bolt 16 to release the nylon washer 21 from its clamped condition, after which the lever 14 may then be turned about the axis of its pivot post 11G by applying force to the handle member 19 to cause the stud bolt to move within the arcuate grooved portion. After the adjustment is made, the handle member 19 is turned about its axis to again clamp the washer 21 between the end of member 19 and the flanged housing parts 11A, 12A, whereby the adjustment is secured.

While the particular embodiments of the present in-invention have been shown and described, it will be obvious to those skilled in the art that changes and modifications may be made without departing from this invention in its broader aspect and, therefore, the aim in the appended claims is to cover all such changes and modifications as fall within the true spirit and scope of this invention.

We claim:
1. A jalousie operator, including a housing; said housing having two mating parts; each of said parts having an arcuate flanged portion; said housing having an arcuate slotted portion defined by the flanged portion of each of said parts; a lever structure pivotally mounted on one of said parts; a stud bolt on said lever structure and extending through said arcuate slotted portion; a combination handle member and clamping member threaded on said stud bolt; washer means on said stud bolt and between said flanged portion of each of said parts and said clamping member and clamped therebetween upon turning of said clamping member on said stud bolt, said lever structure incorporating two concentric ring portions joined by a web; a post on one of said parts extending into the smaller one of said ring portions and about which said lever structure pivots; said arcuate flanged portions defining an arcuate internal channel within which a portion of said lever structure moves and which is in communication with said arcuate slotted portion; each of said parts having mating wall portions which define end walls of said internal channel and also stop members for limiting pivotal movement of said lever portion.

2. A jalousie operator as set forth in claim 1, in which said washer means is of nylon material.

3. A jalousie operator as set forth in claim 1, in which said stud bolt is secured to said lever portion.

4. A jalousie structure, including a housing; said housing having an internal arcuate channel which communicates with an arcuate open channel defined by said housing; a lever structure pivoted on said housing and having a portion thereof movable in said internal arcuate channel; a threaded stud extending from said portion and through said arcuate open channel; and a handle member threaded on said stud for clamping said lever structure to said housing.

5. A jalousie structure as set forth in claim 4, in which the axis of said stud is inclined with respect to the pivotal axis of said lever structure.

References Cited by the Examiner
UNITED STATES PATENTS

| 1,511,010 | 10/1924 | Spencer | 49—346 |
| 2,630,318 | 3/1953 | Connor | 49—87 |

FOREIGN PATENTS 245,439   6/1963   Australia.

MILTON KAUFMAN, *Primary Examiner.*